United States Patent [19]

Merz et al.

[11] 4,172,922

[45] Oct. 30, 1979

[54] RESISTOR MATERIAL, RESISTOR MADE THEREFROM AND METHOD OF MAKING THE SAME

[75] Inventors: Kenneth M. Merz, Gladwyne; Howard E. Shapiro, Philadelphia, both of Pa.

[73] Assignee: TRW, Inc., Cleveland, Ohio

[21] Appl. No.: 825,600

[22] Filed: Aug. 18, 1977

[51] Int. Cl.[2] .......... B32B 17/06; H01B 1/00; H01C 1/012

[52] U.S. Cl. .......... 428/432; 252/513; 252/518; 252/519; 252/520; 427/101; 427/376 A; 427/398 R; 428/433; 338/308; 338/309

[58] Field of Search .......... 427/101, 126, 374 F, 427/376 A, 190, 398 R; 338/309, 21, 308; 252/512, 513, 518, 519, 520; 428/432, 433, 539

[56] References Cited

U.S. PATENT DOCUMENTS

| | | | |
|---|---|---|---|
| 3,264,229 | 8/1966 | Klein | 252/518 |
| 3,496,512 | 2/1970 | Matsuoka et al. | 252/518 |
| 3,503,029 | 3/1970 | Matsuoka | 252/518 |
| 3,509,073 | 4/1970 | Bowman | 252/518 |
| 3,515,686 | 6/1970 | Bowman | 252/518 |
| 3,538,022 | 11/1970 | Bowman | 252/518 |
| 3,538,023 | 11/1970 | Bowman | 252/518 |
| 3,541,029 | 11/1970 | Bowman | 252/519 |
| 3,577,355 | 5/1971 | Blum | 252/512 |
| 3,598,763 | 8/1971 | Mafsuoka | 252/518 |
| 3,663,458 | 5/1972 | Masuyama et al. | 252/518 |
| 3,794,518 | 2/1974 | Howell | 252/512 |
| 3,801,316 | 4/1974 | Bowman | 252/501 |
| 3,928,242 | 12/1975 | May | 252/512 |
| 4,041,436 | 8/1977 | Kouchich et al. | 428/432 |
| 4,051,074 | 9/1977 | Asada | 252/512 |

*Primary Examiner*—George F. Lesmes
*Assistant Examiner*—E. Rollins Buffalon
*Attorney, Agent, or Firm*—Jacob Trachtman

[57] ABSTRACT

A vitreous enamel resistor material comprising a mixture of vitreous glass frit and fine particles of a mixture of zinc oxide (ZnO) and a material which will provide either lithium, tin, nickel, aluminum, indium, titanium, tantalum, zinc, gallium, vanadium, tungsten, or molybdenum. An electrical resistor is made from the resistor material by applying the material to a substrate and firing the coated substrate to a temperature at which the glass melts. Upon cooling, the substrate has on a surface thereof a film of glass having the particles of the mixture embedded therein and dispersed therethroughout. The resistor material provides a resistor having a wide range of resistivities with a low temperature coefficient of resistance and a low voltage coefficient of resistance.

19 Claims, 1 Drawing Figure

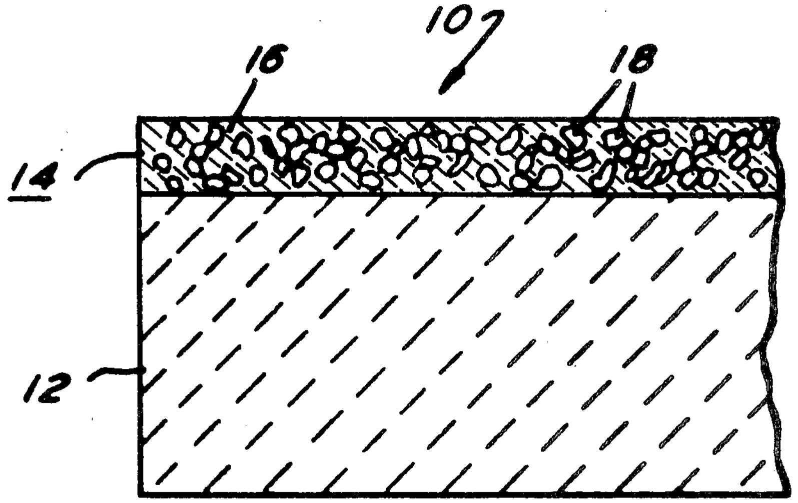
10
16
18
14
12

RESISTOR MATERIAL, RESISTOR MADE THEREFROM AND METHOD OF MAKING THE SAME

The present invention relates to a resistor material, resistors made from the material, and a method of making the same. More particularly, the present invention relates to a vitreous enamel resistor material which provides a resistor having a wide range of resistivities, a low temperature coefficient of resistance and low voltage coefficient of resistance, and which is made from relatively inexpensive materials.

A type of electrical resistor material which has recently come into commercial use is a vitreous enamel resistor material which comprises a mixture of a glass frit and finely divided particles of an electrically conductive material. The vitreous enamel resistor material is coated on the surface of a substrate of an electrical insulating material, usually a ceramic, and fired to melt the glass frit. When cooled, there is provided a film of glass having the conductive particles dispersed therein.

Since there are requirements for electrical resistors having a wide range of resistance values, it is desirable to have vitreous enamel resistor materials with respective properties which allow the making of resistors over a wide range of resistance values. However, it is also desirable that such resistance materials have a low temperature coefficient of resistance and a low voltage coefficient of resistance so that the resistors are relatively stable with respective to changes in temperature and applied voltage. Heretofore, the resistor materials which had these characteristics generally utilize the noble metals as the conductive particles and are therefore relatively expensive. Although zinc oxide with additives has been used as a resistor, it has been generally used in a form which is sensitive to voltage variations, i.e. having a high voltage coefficient of resistance, as shown by the following U.S. Pat. Nos.:

3,496,512 to M. Matsuoka et al "Non-Linear Resistors" Feb. 17, 1970

3,503,029 to M. Matsuoka, "Non-Linear Resistor" Mar. 24, 1970

3,598,763 to M. Matsuoka et al, "Manganese-Modified Zinc Oxide Voltage Variable Resistors" Aug. 10, 1971

3,663,458 to T. Masuyama et al, "Non-Linear Resistors of Bulk Type" May 16, 1972

It is therefore, an object of the present invention to provide a novel resistor material and resistor made therefrom.

It is another object of the present invention to provide a novel vitreous enamel resistor material and a resistor made therefrom.

It is a still further object of the present invention to provide a vitreous enamel resistor material which provides a resistor having a wide range of resistivities, a relatively low temperature coefficient of resistance, and a relatively low voltage coefficient of resistance.

It is another object of the present invention to provide a vitreous enamel resistor material which provides a resistor having a wide range of resistances, a relatively low temperature coefficient of resistance, a relatively low voltage coefficient of resistance and which material is relatively inexpensive.

Other objects will appear hereinafter.

These objects are achieved by a resistor material comprising a mixture of a glass frit and finely divided particles of a conductive phase which consists of a mixture of zinc oxide and a material which provides a metal selected from the group consisting of lithium, tin, nickel, aluminum, indium, titanium, tantalum, zinc, gallium, vanadium, tungsten and molybdenum.

The invention accordingly comprises a composition of matter possessing the characteristics, properties, and the relation of components which are exemplified in the compositions hereinafter described, and the scope of the invention is indicated in the claims.

For a fuller understanding of the nature and objects of the invention, reference should be had to the following detailed description taken in connection with the accompanying drawing in which:

The FIGURE is a sectional view of a portion of a resistor made with the resistor material of the present invention.

In general, the vitreous enamel resistor material of the present invention comprises a mixture of a vitreous glass frit and fine particles of a conductive phase which is a mixture of zinc oxide (ZnO) and an additive material which provides one of the metals lithium, tin, nickel, aluminum, indium, titanium, zinc, gallium, vanadium, tungsten, or molybdenum. Some of the materials which will provide such metals are lithium hydroxide ($LiOH\text{-}H_2O$) for lithium; stannous sulfate ($SnSO_4$), stannous oxide (SnO) or stannic oxide ($SnO_2$) for tin; nickel nitrate ($Ni(NO_3)_2 6H_2O$) for nickel; aluminum oxide, sulfate, nitrate or hydroxide for aluminum; the oxides of indium, titanium, tantalum, gallium, vanadium, tungsten, and molybdenum for their respective metals; and zinc metal for zinc. The conductive phase contains up to 5 atomic percent of the additive metal. The conductive phase is present in the resistor material in the amount of 40% to 85% by volume, and preferably in the amount of 50% to 80% by volume.

The glass frit used may be any of the well known compositions used for making vitreous enamel resistor compositions and which has a melting point below that of the conductive phase. However, it has been found preferable to use a borosilicate frit, and particularly an alkaline earth borosilicate frit, such as a barium or calcium borosilicate frit. The preparation of such frits is well known and consists, for example, of melting together the constituents of the glass in the form of the oxides of the constituents, and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barium oxide will be produced from barium carbonate, etc. The coarse frit is preferably milled in a ball mill with water to reduce the particles size of the frit and to obtain a frit of substantially uniform size.

The resistor material of the present invention is preferably made by first mixing together the zinc oxide and the material which will provide the desired metal in the proper proportions. This can be achieved by ball milling the mixture with a liquid vehicle, such as water. The liquid vehicle is then evaporated and the remaining powder is then heated in an atmosphere of nitrogen with up to 15% hydrogen to a peak temperature of between 25° C. to 1250° C. for a ½ to 2 hour cycle in a conveyor belt furnace. The heat treated mixture is then mixed with the glass frit in the appropriate proportions. The mixing is preferably carried out by ball milling the ingredients in an organic medium, such as butyl carbitol acetate. The mixture is then adjusted to the proper viscosity for the desired manner of applying the resistor material to a substrate by either adding or removing the liquid medium of the mixture.

To make a resistor with the resistor material of the present invention, the resistor material is applied to a uniform thickness on the surface of a substrate. The substrate may be a body of any material which can withstand the firing temperature of the resistor material. The substrate is generally a body of an insulating material such as ceramic, glass, porcelain, steatite, barium titanate, alumina, or the like. The resistor material may be applied on the substrate by brushing, dipping, spraying, or screen stencil application. The substrate with the resistor material coating is then fired in a conventional furnace at a temperature at which the glass frit becomes molten. The resistor material is preferably fired in an inert or non-oxidizing atmosphere, such as argon, helium or nitrogen. The particular firing temperature used depends on the melting temperature of the particular glass frit used. When the substrate and resistor material are cooled, the vitreous enamel hardens to bond the resistance material to the substrate.

As shown in the FIGURE of the drawing, a resultant resistor of the present invention is generally designated as 10*. Resistor 10* comprises a ceramic substrate 12* having a layer 14* of the resistor material of the present invention coated and fired thereon. The resistor material layer 14* comprises the glass 16* containing the finely divided particles 18* of the conductive phase. The conductive phase particles 18* are embedded in and dispersed throughout the glass 16*.

The following examples are given to illustrate certain preferred details of the invention, it being understood that the details of the examples are not to be taken as in any way limiting the invention thereto.

EXAMPLE I

A resistor material was made by first mixing together zinc oxide (ZnO) and stannous sulfate in an amount to provide 0.15 atomic percent of tin to form a conductive phase. The ingredients were mixed together in a ball mill with water. The conductive phase mixture was then evaporated to dryness at 110° C. The dry conductive phase mixture was then heated at 800° C. in an atmosphere of 95% nitrogen and 5% hydrogen. Different portions of the conductive phase were each then mixed with a glass frit of the composition of by weight 48.5% barium oxide (BaO), 7.7% calcium oxide (CaO), 23.3% boron oxide ($B_2O_3$) and 20.7% silicon dioxide ($SiO_2$). Each of the mixtures contained a different amount of the conductive phase ranging from 40% by volume to 80% by volume. Each of the mixtures was ball milled in butyl carbitol acetate. This formed a plurality of resistor materials having different ratios of the conductive phase to the glass frit.

Each of the resistor materials was coated on rods of Alsimag 614 alumina which had uniformily spaced notches along their length. This coating operation was achieved by dipping the rods into the resistor material. The rods were dried in air at 150° C. for ¼ hour in a vertical position and then fired in a horizontal position at 750° C. in a nitrogen atmosphere over a ½ hour cycle in a conveyor belt furnace. Each of the rods was then coated with bands of a silver conductive material at its ends and at each of the notches, and the conductive material was cured at 200° C. for one hour. The rods were then broken apart at the notches to form individual resistors and terminals were attached to the ends of the resistors. The resistance of each of the resistors was measured and the resistors were tested for determining their temperature coefficients of resistance and their voltage coefficients of resistance. The results of these tests are shown in Table I by giving the average value obtained from testing a plurality of resistors of each group.

TABLE I

| | | | | | |
|---|---|---|---|---|---|
| Conductive Phase (volume %) | 40 | 45 | 50 | 55 | 80* |
| Resistance (ohms/square) | 22M | 267K | 41K | 8.8K | 2.5K |
| Temperature coeff. of Resistance (PPM/°C.) | | | | | |
| +150° C. | −542 | −260 | −129 | −74 | −309 |
| −55° C. | −498 | −141 | −84 | −71 | −176 |
| Voltage coeff. of Resistance (%/volt) | −.084 | −.028 | −.0035 | −.0020 | −.0080 |

*Coated rods fired at 800° C.

EXAMPLE II

A resistor material was made in the manner described in EXAMPLE I, except that the conductive phase mixture was heat treated at 550° C. and the different portions of the conductive phase were mixed with different amounts of the glass frit. Resistors were made from the resistor materials as described in EXAMPLE I and the average resistance and temperature coefficient of resistance for each of the different groups of resistors is shown in Table II.

TABLE II

| | | | | | |
|---|---|---|---|---|---|
| Conductive Phase (volume %) | 50 | 55 | 60 | 70 | 75 |
| Resistance (ohms/square) | 39K | 17K | 12K | 5.6K | 2.6K |
| Temperature coeff. of Resistance (PPM/°C.) | | | | | |
| +150° C. | −100 | 66 | 24 | 18 | −41 |
| −55° C. | −68 | 24 | 60 | 136 | 144 |
| Voltage coeff. of Resistance (%/volt) | −.001 | −.0006 | −.0012 | −.0007 | −.0008 |

EXAMPLE III

Resistor materials were made by first forming different batches of a conductive phase by mixing together zinc oxide and stannous sulfate with the amount of the stannous sulfate being different in each batch to provide the batches with different amounts of tin varying from 0.04 atomic percent to 0.6 atomic percent. Each batch was mixed together in the manner described in EXAMPLE I, and the dried mixtures were heat treated at 550° C. Each of the batches of the conductive phase, was then mixed with a glass frit of the composition described in EXAMPLE I, with each of the mixtures containing 60% by volume of the conductive phase. The resistor materials were then made into resistors in the manner described in EXAMPLE I. The resultant resistors had the resistance values and temperature coefficients of resistance shown in Table III.

TABLE III

| | | | | | |
|---|---|---|---|---|---|
| Tin (atomic %) | 0.6 | 0.3 | 0.15 | 0.08 | 0.04 |
| Resistance (ohms/square) | 15K | 13K | 12K | 13K | 13K |
| Temperature coeff. | | | | | |

TABLE III-continued

| | | | | | |
|---|---|---|---|---|---|
| of Resistance (PPM/°C.) | | | | | |
| +150° C. | −128 | −116 | 24 | 133 | 140 |
| −55° C. | −130 | −169 | 60 | 153 | 193 |
| Voltage coeff. of Resistance (%/volt) | −.0156 | −.0306 | −.0012 | −.0007 | −.0008 |

EXAMPLE IV

Resistor materials were made in the same manner as described in EXAMPLE III, except that the various conductive phases were heat treated at 800° C. The resistance materials were made into resistors as described in EXAMPLE III. Table IV shows the resistance values and temperature coefficients of resistance of the resultant resistors.

TABLE IV

| | | | | | |
|---|---|---|---|---|---|
| Tin (atomic %) | 0.6 | 0.3 | 0.15* | 0.08 | 0.04 |
| Resistance (ohms/square) | 13K | 19K | 9.4K | 5.1K | 8.7K |
| Temperature coeff. of Resistance (PPM/°C.) | | | | | |
| +150° C. | −100 | 19 | 91 | 92 | 142 |
| −55° C. | −64 | 53 | 76 | 61 | 130 |
| Voltage coeff. of Resistance (%/volt) | −.0009 | ±.0007 | −.0006 | −.005 | −.0014 |

*55% by volume of conductive phase

EXAMPLE V

A resistor material was made in the same manner as described in EXAMPLE I, except that the amount of stannous sulfate used in the conductive phase was sufficient to provide 5 atomic percent of tin, the dried conductive phase was heat treated at 550° C., and the conductive phase and glass mixture contained 50% by volume of each. Resistors were made from the resistor material in the manner described in EXAMPLE I, except that the coated rods were fired at 700° C. The resultant resistors had an average resistance of 2.2M ohms/square and an average temperature coefficient of resistance of −279 parts per million/°C. from 20° C. to 150° C., and −322 parts per million/°C. from 20° C. to −55° C. The average voltage coefficient of resistance was −0.0123Z/volt.

EXAMPLE VI

A resistor material was made in the same manner as described in EXAMPLE I, except that the amount of stannous sulfate used in the conductive phase was sufficient to provide 2.5 atomic percent of tin, the dried conductive phase was heat treated at 550° C., and the conductive phase and glass mixture contained 50% by volume of each. Resistors were made from the resistor material in the manner described in EXAMPLE I, except that the coated rods were fired at 800° C. The resultant resistors had an average resistance of 37K ohms/square and an average temperature coefficient of resistance of −675 parts per million/°C. from +20° C. to +150° C., and −652 parts per million/°C. from +20° C. to −55° C.

EXAMPLE VII

A resistor material was made in the manner described in EXAMPLE I, except that the conductive phase was zinc oxide mixed with sufficient lithium hydroxide ($LiOH\text{-}H_2O$) to provide 0.15 atomic percent of lithium. The heat treated conductive phase was mixed with the glass frit in an amount so that there was 55% by volume of the conductive phase. Resistors were made from the resistor material in the manner described in EXAMPLE I, except that the coated rods were fired at 700° C. The resultant resistors had the following electrical characteristics:

| | |
|---|---|
| Resistance (ohms/square) | 59K |
| Temperature coeff. of Resistance (PPM/°C. | |
| +150° C. | −85 |
| −55° C. | −143 |
| Voltage coeff. of Resistance (%/volt) | −.0042 |

EXAMPLE VIII

Resistors were made in the manner described in EXAMPLE VII, except that the conductive phase of the resistor material was a mixture of zinc oxide and sufficient stannous sulfate to provide 0.15 atomic percent of tin. The resultant resistors had the following electrical characteristics:

| | |
|---|---|
| Resistance (ohms/square) | 26K |
| Temperature coeff. of Resistance (PPM/°C. | |
| +150° C. | 190 |
| −55° C. | 220 |
| Voltage coeff. of Resistance (%/volt) | −.0004 |

EXAMPLE IX

Resistors were made in the manner described in EXAMPLE VII, except that the conductive phase of the resistor material was a mixture of zinc oxide and a sufficient amount of titanium oxide to provide 0.15 atomic percent of titanium. The resultant resistors had the following electrical characteristics:

| | |
|---|---|
| Resistance (ohms/Square) | 55K |
| Temperature coeff. of Resistance (PPM/°C.) | |
| +150° C. | −40 |
| −55° C. | −53 |
| Voltage coeff. of Resistance (%/volt) | −.0017 |

EXAMPLE X

Resistors were made in the manner described in EXAMPLE VII, except that the conductive phase of the resistor material was a mixture of zinc oxide and a sufficient amount of tantalum oxide to provide 0.15 atomic percent of tantalum. The resultant resistors had the following electrical characteristics:

| | |
|---|---|
| Resistance (ohms/square) | 54K |
| Temperature coeff. of Resistance (PPM/°C.) | |
| +150° C. | −196 |
| −55° C. | −286 |
| Voltage coeff. of | |

-continued

| | |
|---|---|
| Resistance (%/volt) | −.0018 |

EXAMPLE XI

Resistors were made in the manner described in EXAMPLE VII, except that the conductive phase of the resistor material was a mixture of zinc oxide and a sufficient amount of indium oxide to provide 0.15 atomic percent of indium, and the coated rods were fired at 750° C. The resultant resistors had the following electrical characteristics:

| | |
|---|---|
| Resistance | |
| (ohms/square) | 86K |
| Temperature coeff. | |
| of Resistance (PPM/°C.) | |
| +150° C. | −584 |
| −55° C. | −462 |
| Voltage coeff. of | |
| Resistance (%/volt) | −.0083 |

EXAMPLE XII

A resistor material was made as described in EXAMPLE I, except that the conductive phase was a mixture of zinc oxide and sufficient stannous oxide (SnO) to provide 0.15 atomic percent of tin. Also, the resistor material included 60% by volume of the conductive phase, and 40% by volume of the glass frit. Resistors were made with the resistor material by mixing the resistor material in a screening vehicle and screen printing the resistor material onto the surface of a ceramic substrate. The coated substrate was fired at 750° C. in a nitrogen atmosphere over a ½ hour cycle. The resultant resistors had the following average electrical characteristics:

| | |
|---|---|
| Resistance | |
| (ohms/square) | 20K |
| Temperature coeff. | |
| of Resistance (PPM/°C.) | |
| +150° C. | −22 |
| −55° C. | ±53 |
| Voltage coeff. of | |
| Resistance (%/volt) | −.0038 |

EXAMPLE XIII

A resistor material was made as described in EXAMPLE I, except that the conductive phase was a mixture of zinc oxide and sufficient stannic oxide ($SnO_2$) to provide 0.15 atomic percent of tin, and the resistor material included 60% by volume of the conductive phase. Resistors were made from the resistor material as described in EXAMPLE XII, and the resultant resistors had the following average electrical characteristics:

| | |
|---|---|
| Resistance | |
| (ohms/square) | 20K |
| Temperature coeff. | |
| of Resistance (PPM/°C.) | |
| +150° C. | 14 |
| −55° C. | −107 |
| Voltage coeff. of | |
| Resistance (%/volt) | −.0064 |

EXAMPLE XIV

A resistor material was made as described in EXAMPLE I, except that the zinc oxide was mixed with 0.15 atomic percent zinc to form the conductive phase, and the resistor material included 60% by volume of the conductive phase. Resistors were made with the resistor material as described in EXAMPLE XII, and the resultant resistors had the following average electrical characteristics:

| | |
|---|---|
| Resistance | |
| (ohms/square) | 21K |
| Temperature coeff. | |
| of Resistance (PPM/°C.) | |
| +150° C. | −191 |
| −55° C. | −311 |
| Voltage coeff. of | |
| Resistance (%/volt) | −.0375 |

EXAMPLE XV

A resistor material was made as described in EXAMPLE I, except that the zinc oxide was mixed with sufficient gallium oxide ($Ga_2O_3$) to provide 0.30 atomic percent of gallium. The resistor material was made into resistors as described in EXAMPLE XII, and the resultant resistors had the following average electrical characteristics:

| | |
|---|---|
| Resistance | |
| (ohms/square) | 23K |
| Temperature coeff. | |
| of Resistance (PPM/°C.) | |
| +150° C. | −493 |
| −55° C. | −521 |
| Voltage coeff. of | |
| Resistance (%/volt) | −.023 |

EXAMPLE XVI

A resistor material was made by mixing together zinc oxide (ZnO) and sufficient vanadium oxide ($V_2O_5$) to provide 0.04 atomic percent of vanadium to form the conductive phase. The conductive phase was mixed with the glass frit described in EXAMPLE I to form a resistor material containing 60% by volume of the conductive phase. The resistor material was mixed with a screening vehicle and screen printed onto ceramic substrates. The coated substrates were fired at 750° C. in a nitrogen atmosphere over a ½ hour cycle. The resultant resistors had the following average electrical characteristics:

| | |
|---|---|
| Resistance | |
| (ohms/square) | 4.6K |
| Temperature coeff. | |
| of Resistance (PPM/°C.) | |
| +150° C. | ±17 |
| −55° C. | −27 |
| Voltage coeff. of | |
| Resistance (%/volt) | −.0056 |

EXAMPLE XVII

Resistors were made in the manner described in EXAMPLE XVI, except that the conductive phase was a mixture of zinc oxide (ZnO) and sufficient tungsten oxide ($WO_3$) to provide 0.15 atomic percent of tungsten. The resultant resistors had the following average electrical characteristics:

| | |
|---|---|
| Resistance (ohms/square) | 3.6K |
| Temperature coeff. of Resistance (PPM/°C.) | |
| +150° C. | −147 |
| −55° C. | −240 |
| Voltage coeff. of Resistance (%/volt) | −.036 |

EXAMPLE XVIII

Resistors were made in the manner described in EXAMPLE XVI, except that the conductive phase was a mixture of zinc oxide and molybdenum oxide ($MoO_3$) to provide 0.15 atomic percent of molybdenum, and the coated substrates were fired at 725° C. The resultant resistors had the following average electrical characteristics:

| | |
|---|---|
| Resistance (ohms/square) | 13K |
| Temperature coeff. of Resistance (PPM/°C.) | |
| +150° C. | −188 |
| −55° C. | −226 |
| Voltage coeff. of Resistance (%/volt) | −.0062 |

EXAMPLE XIX

A resistor material was made in the same manner as described in EXAMPLE I, except that the conductive phase was a mixture of the zinc oxide and sufficient nickel nitrate ($Ni(NO_3)_2 6H_2O$) to provide 0.04 atomic percent of nickel, and the resistor material included 55% by volume of the conductive phase. Resistors were made from the resistor material in the manner described in EXAMPLE I. The resultant resistors had the following average electrical characteristics:

| | |
|---|---|
| Resistance (ohms/square) | 114K |
| Temperature coeff. of Resistance (PPM/°C.) | |
| +150° C. | −474 |
| −55° C. | −468 |
| Voltage coeff. of Resistance (%/volt) | −.0025 |

EXAMPLE XX

A resistor material was made using as the conductive phase a powdered zinc oxide purchased from New Jersey Zinc Co. of Bethlehem, Pa. as Grade HC 238 which by analysis contained between 0.1 and 1% by weight of aluminum. This conductive phase was mixed with the glass frit described in EXAMPLE I with the mixture containing 60% by volume of the conductive phase. Resistors were made from the resistor material as described in EXAMPLE I, and the resultant resistors had the following average electrical characteristics:

-continued

| | |
|---|---|
| Resistance (ohms/square) | 90K |
| Temperature coeff. of Resistance (PPM/°C.) | |
| +150° C. | −447 |
| −55° C. | −290 |
| Voltage coeff. of Resistance (%/volt) | −.0043 |

From the above Examples, there can be seen the effects on the electrical characteristics of the resistor of the present invention, of variations in the composition of the resistor material and the method of making the resistor. EXAMPLES I and II show the effects of varying the amount of the conductive phase in the resistor material. EXAMPLES III, IV, V, and VI show the effects of varying the amount of the additive metal in the conductive phase. The remaining Examples show the effects of varying the additive metal used in the conductive phase.

It will thus be seen that the objects set forth above, among those made apparent from the preceding description, are efficiently attained and, since certain changes may be made in the above compositions of matter without departing from the scope of the invention, it is intended that all matter contained in the above description shall be interpreted as illustrative and not in a limiting sense.

What we claim is:

1. A vitreous enamel resistor material comprising a glass frit and particles of a conductive phase, said conductive phase comprising a mixture of conductive zinc oxide and an additive material providing a metal selected from the group consisting of lithium, tin, nickel, aluminum, indium, titanium, tantalum, zinc, gallium, vanadium, tungsten and molybdenum, the conductive phase including an amount of the additive material to provide up to 5 atomic percent of the metal, and the zinc oxide and additive particles being present in the amount of 40% to 85% by volume.

2. A vitreous enamel resistor material in accordance with claim 1 in which the conductive phase includes an amount of the additive material to provide 0.04 to 0.6 atomic percent of the metal.

3. A vitreous enamel resistor material in accordance with claim 1 in which the conductive phase includes an amount of the additive material to provide 0.15 atomic percent of the metal.

4. A vitreous enamel resistor material in accordance with claim 1 in which the conductive phase is present in the amount of 50% to 80% by volume.

5. A vitreous enamel resistor material in accordance with claim 4 in which the glass frit is a borosilicate glass.

6. A vitreous enamel resistor material in accordance with claim 5 in which the glass frit is an alkaline earth borosilicate glass.

7. An electrical resistor comprising an insulating substrate and a resistor material on a surface of said substrate, said resistor material comprising particles of a mixture of conductive zinc oxide and an additive material providing a metal selected from the group consisting of lithium, tin, nickel, aluminum, indium, titanium, tantalum, zinc, gallium, vanadium, tungsten and molybdenum embedded in and dispersed throughout a glass, the amount of additive material in the mixture providing up to 5 atomic percent of the metal, and the zinc oxide and the additive material being present in the amount of 40% to 85% by volume.

8. An electrical resistor in accordance with claim 7 in which there is an amount of additive material in the mixture to provide 0.04 to 0.6 atomic percent of the metal.

9. An electrical resistor in accordance with claim 7 in which there is an amount of additive material in the mixture to provide 0.15 atomic percent of the metal.

10. An electrical resistor in accordance with claim 7 in which the resistor material contains 50% to 80% by volume of the mixture of the zinc oxide and the additive material.

11. An electrical resistor in accordance with claim 10 in which the glass is a borosilicate glass.

12. An electrical resistor in accordance with claim 11 in which the glass is an alkaline earth borosilicate glass.

13. An electrical resistor comprising a substrate of an electrical insulating material and a resistor layer on a surface of said substrate, said resistor layer being formed by blending together a glass frit and a mixture of zinc oxide and an additive material providing a metal selected from the group consisting of lithium, tin, nickel, aluminum, indium, titanium, tantalum, zinc, gallium, vanadium, tungsten and molybdenum, the amount of additive material in the mixture providing up to 5 atomic percent of the metal, the zinc oxide and additive material being present in the amount of 40% to 85% by volume, coating said material on the surface of the substrate, firing said coated substrate in a non-oxidizing atmosphere at a temperature at which the glass frit melts, and then cooling the coated substrate to provide a resistive layer of glass bonded to the substrate and having conductive particles of zinc oxide and resultant additive material embedded in and dispersed throughout the glass.

14. An electrical resistor in accordance with claim 13 in which the glass frit and the mixture are blended together in a vehicle and the coating is dried prior to firing the coated substrate.

15. An electrical resistor in accordance with claim 14 in which the resistor material contains 50% to 80% by volume of the mixture of the zinc oxide and the additive material.

16. A method of making an electrical resistor comprising the steps of forming a conductive phase by mixing together zinc oxide and an additive material providing a metal selected from the group consisting of lithium, tin, nickel, aluminum indium, titanium, tantalum, zinc, gallium, vanadium, tungsten and molybdenum, the amount of additive material in the conductive phase providing up to 5 atomic percent of the metal, the zinc oxide and additive material being present in the amount of 40% and 85% by volume, mixing the conductive phase with a glass frit, coating the mixture of the conductive phase and glass frit onto the surface of a substrate of an electrical insulating material, firing said coated substrate in a non-oxidizing atmosphere at a temperature at which the glass frit melts, and then cooling said coated substrate to provide a resistive layer of glass bonded to the substrate and having conductive particles of zinc oxide and resultant additive material embedded in and dispersed throughout the glass.

17. The method of making an electrical resistor in accordance with claim 16 in which the zinc oxide and additive material are mixed together in a liquid vehicle and after mixing the liquid is removed to provide a dry mixture.

18. The method of making an electrical resistor in accordance with claim 16 in which the glass frit and conductive phase are mixed together in a vehicle and the coating is dried before being fired.

19. The method of making an electrical resistor in accordance with claim 16 in which the mixture of the glass frit and conductive phase contains 50% to 80% by volume of the conductive phase.

* * * * *

UNITED STATES PATENT AND TRADEMARK OFFICE
CERTIFICATE OF CORRECTION

PATENT NO. : 4,172,922

DATED : October 30, 1979

INVENTOR(S) : Kenneth M. Merz and Howard E. Shapiro

It is certified that error appears in the above-identified patent and that said Letters Patent are hereby corrected as shown below:

Column 5, line 46, "-0.0123Z/volt" should read --0.0123%/volt--

Signed and Sealed this

***Twenty-sixth* Day of *February 1980***

[SEAL]

*Attest:*

SIDNEY A. DIAMOND

*Attesting Officer* *Commissioner of Patents and Trademarks*